US006956356B2

(12) United States Patent  
Elder

(10) Patent No.: US 6,956,356 B2  
(45) Date of Patent: Oct. 18, 2005

(54) APPARATUS FOR IMPROVING PROTECTION OF A BATTERY PACK IN A VERY LOW POWER STATE

(75) Inventor: Garry Ross Elder, Rowlett, TX (US)

(73) Assignee: Texas Instruments Incorporated, Dallas, TX (US)

(*) Notice: Subject to any disclaimer, the term of this patent is extended or adjusted under 35 U.S.C. 154(b) by 111 days.

(21) Appl. No.: 10/745,057

(22) Filed: Dec. 22, 2003

(65) Prior Publication Data

US 2005/0134228 A1 Jun. 23, 2005

(51) Int. Cl.[7] .......................................... H01M 10/46
(52) U.S. Cl. ................................................... 320/134
(58) Field of Search ........................ 320/116, 134, 135, 320/136, 162, 164

(56) References Cited

U.S. PATENT DOCUMENTS 4,716,354 A * 12/1987 Hacker ....................... 320/114
5,254,930 A * 10/1993 Daly .......................... 320/119

* cited by examiner

Primary Examiner—Edward H. Tso
(74) Attorney, Agent, or Firm—W. Daniel Swayze, Jr.; W. James Brady; Frederick J. Telecky, Jr.

(57) ABSTRACT

An apparatus for improving protection of a battery pack when the battery pack is in a very low power state, the battery pack including a plurality of battery cells coupled to present an output voltage at a battery potential locus and a protection device for providing a plurality of safeguards to protect the battery pack, affects operation of the protection device to control at least one safeguard and includes a current sensing unit coupled with the plurality of battery cells and with the protection device. The current sensing unit senses a battery traversing current associated with at least one battery cell. The current sensing unit generates an alerting signal when the battery traversing current exceeds a predetermined value. The protection device enables the at least one safeguard in response to the alerting signal.

14 Claims, 4 Drawing Sheets

APPARATUS FOR IMPROVING PROTECTION OF A BATTERY PACK IN A VERY LOW POWER STATE

BACKGROUND OF THE INVENTION

The present invention is directed to protection for a battery pack, and especially to improving operation of a protection device associated with a battery pack in a very low power state.

A battery pack may be in a very low power state for one of several reasons. For example, a battery pack may be in a very low power state because it is nearly fully spent or drained. A battery pack may be in a very low power state because it is a new battery pack that has never been charged up.

Yet another reason that a battery pack may be in a very low power state is because its protection mechanism or system (i.e., electronics circuitry associated with and usually integrally housed with a battery pack) has been ordered into such a low power state. Battery packs typically have a number of different power states, such as a NORMAL state which is extant during normal operations of a unit powered by a battery pack. Another power state often used with a battery pack is a SLEEP state. A SLEEP state is usually employed after no operation of the device powered by the battery pack is noted for a predetermined time.

An example of such a situation is there not having been any key strokes entered to a laptop computer for a given time interval so the laptop computer orders its battery pack to a SLEEP state or mode. In such a SLEEP state the laptop battery pack powers fewer functions of the laptop and thereby conserves battery power for later availability when the laptop is being used. This is a way to extend useful battery life for a battery-powered device. It is typical that safeguards are still in place to protect the battery pack when a laptop orders the battery pack into a SLEEP state. Representative safeguards include, by way of example and not by way of limitation, protection against over-voltage, under-voltage, overload, over-current and short-circuit.

Another power state into which a battery pack may be placed is known as a SHIP state (sometimes referred to as a SHUTDOWN state). A SHIP power state is a sort of extended sleep mode that is generally employed for extending shelf life of a battery pack or for conserving battery power during other lengthy dormant periods such as when the battery pack is in shipment. When a battery pack is in a SHIP state or mode it is in a very low power mode (or, ultra-low power mode) during which power is conserved to a great degree by denying of power to various functions, including by way of example and not by way of limitation, the "gas gauge" function for relating amount of power used and safety FET (field effect transistor) control. Safety FETs are provided to isolate the battery pack from voltage or current that exceeds the safe operating parameters of the battery chemistry to the point of rendering the cells unusable and un-repairable.

There is a need for an apparatus for improving protection of a battery pack when the battery pack is in a very low power state.

SUMMARY OF THE INVENTION

An apparatus for improving protection of a battery pack when the battery pack is in a very low power state, the battery pack including a plurality of battery cells coupled to present an output voltage at a battery potential locus and a protection device for providing a plurality of safeguards to protect the battery pack, affects operation of the protection device to control at least one safeguard and includes a current sensing unit coupled with the plurality of battery cells and with the protection device. The current sensing unit senses a battery traversing current associated with at least one battery cell. The current sensing unit generates an alerting signal when the battery traversing current exceeds a predetermined value. The protection device enables the at least one safeguard in response to the alerting signal.

It is, therefore, an object of the present invention to provide an apparatus for improving protection of a battery pack when the battery pack is in a very low power state.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
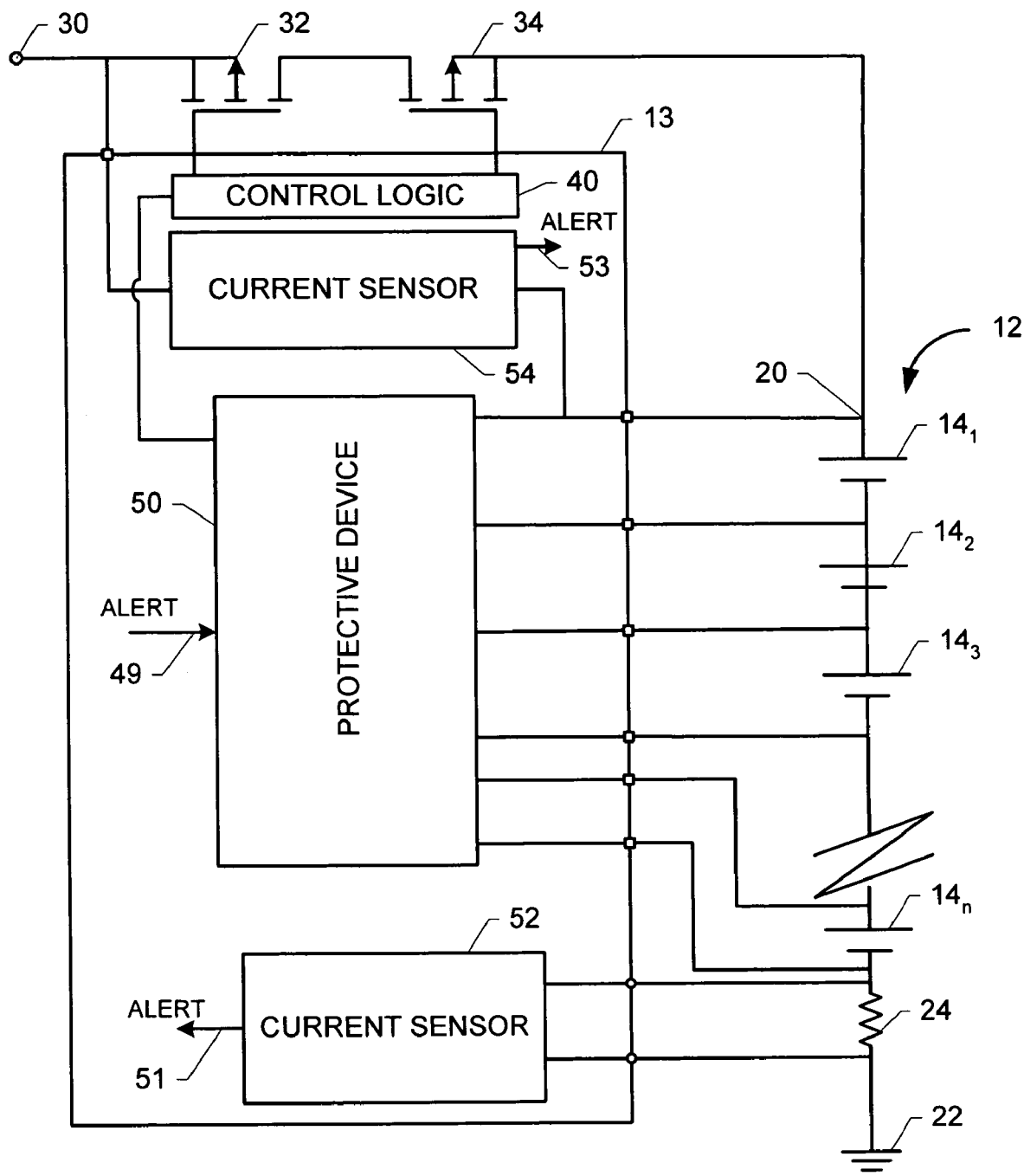
FIG. 1 is a schematic diagram illustrating the preferred embodiment of the present invention.

FIG. 1 is a schematic diagram illustrating the preferred embodiment of the present invention. In FIG. 1, a battery pack 10 includes a battery cell array 12 and a protective system 13. Battery cell array 12 includes a plurality of batteries, represented by battery cells $14_1$, $14_2$, $14_3$, $14_n$ coupled together to present an output voltage at a battery potential locus 20. The indicator "n" is employed to signify that there can be any number of battery cells $14_n$ in battery cell array 12. The inclusion of four battery cells $14_1$, $14_2$, $14_3$, $14_n$ in FIG. 1 is illustrative only and does not constitute any limitation regarding the number of battery cells that may be included in battery cell array 12. Battery cells $14_1$, $14_2$, $14_3$, $14_n$ are connected in series between battery potential locus 20 and a ground locus 22 via a resistor 24. Resistor 24 is proximate with ground locus 22.

A charging potential (not shown in FIG. 1) may be applied at a charging locus 30 for charging battery cell array 12. Charging locus 30 is coupled with battery cell array 12 via a charge FET (field effect transistor) 32 and a discharge FET 34 coupled in series. A control logic unit 40 is coupled with charge FET 32 and discharge FET 34 to control their operation and thereby control connection of charging locus 30 with battery cell array 12. Control logic unit 40 is coupled with a protective device 50. Protective device 50 is also coupled across each respective cell $14_1$, $14_2$, $14_3$, $14_n$ in battery cell array 12. Protective device 50 is illustrated in FIG. 1 as a single unitary protective device. However, protective device 50 may be embodied in a plurality of individual protective devices (not shown in FIG. 1), each of which individual protective devices is connected across a respective battery cell $14_1$, $14_2$, $14_3$, $14_n$.

A current sensor device 52 is coupled across resistor 24. Current sensor device 52 has an alert signal output locus 51. Protective device 50 has an alert signal input locus 49 that is coupled with alert signal output locus 51 (connection not shown in FIG. 1). Whenever battery pack 10 is in a very low or an ultra-low power state and current through resistor 24 is greater than a predetermined amount current sensor device 52 generates an ALERT signal at alert signal output locus 51. Protective device 50 receives the ALERT signal at alert signal input locus 49 and responds to the ALERT signal by enabling predetermined safeguards that are disabled because battery pack 10 is in an ultra-low power state.

Another current sensor device 54 is coupled with charging locus 30 and battery potential locus 20. Current sensor device 54 has an alert signal output locus 53. Alert signal output locus 53 is coupled with alert signal input locus 49 (connection not shown in FIG. 1). Whenever battery pack 10 is in a very low or an ultra-low power state and current between charging locus 30 and battery potential locus 20 is greater than a predetermined amount current sensor 54 generates an ALERT signal at alert signal output locus 53. Protective device 50 receives the ALERT signal at alert signal input locus 49 and responds to the ALERT signal by enabling predetermined safeguards that are disabled because battery pack 10 is in an ultra-low power state.

Whenever battery pack 10 is in an ultra-low power state most protection features or safeguards provided by protection device 50 are disabled to conserve power. In such an ultra-low power state, FETs 32, 34 are also usually turned off. Prior art battery packs only permit exiting the ultra-low power state by applying a voltage to charging locus 30 that is greater than potential at battery potential locus 20. This operation is typically accomplished using a battery charger unit connected with charging locus 30.

However, if a short circuit occurs that causes a fault manifested by excessive current flow between charging locus 30 and battery potential locus 20, then an over-current or overload condition could occur. An example of a circumstance in which such a fault may occur is if one of FETs 32, 34 is damaged when using a charging unit attached with charging locus 30 and a resulting reverse current from charging locus 30 to battery potential locus 20 is great enough to overcome one of FETs 32, 34. Protective device 50 cannot protect against an over-current or overload condition because safeguards protecting against such conditions are disabled while battery pack 10 is in the ultra-low state. As a result, battery pack 10 may be damaged beyond use or repair.

The apparatus of the present invention equips battery pack 10 to sense current draw that would occur in the circumstance of applying a voltage to charging locus 30 with either of FETs 32, 34 damaged. Protective device 50 is structured to respond to the current sensing (i.e., responds to the ALERT signal from either of current sensors 52, 54) to enable appropriate safeguards to be exercised by protective device 50 to keep battery pack 10 safe. In contrast, prior art battery protection systems typically employ a voltage sensor in place of current sensor 54, and typically have no structure similar to current sensor 52.

Figure 2:
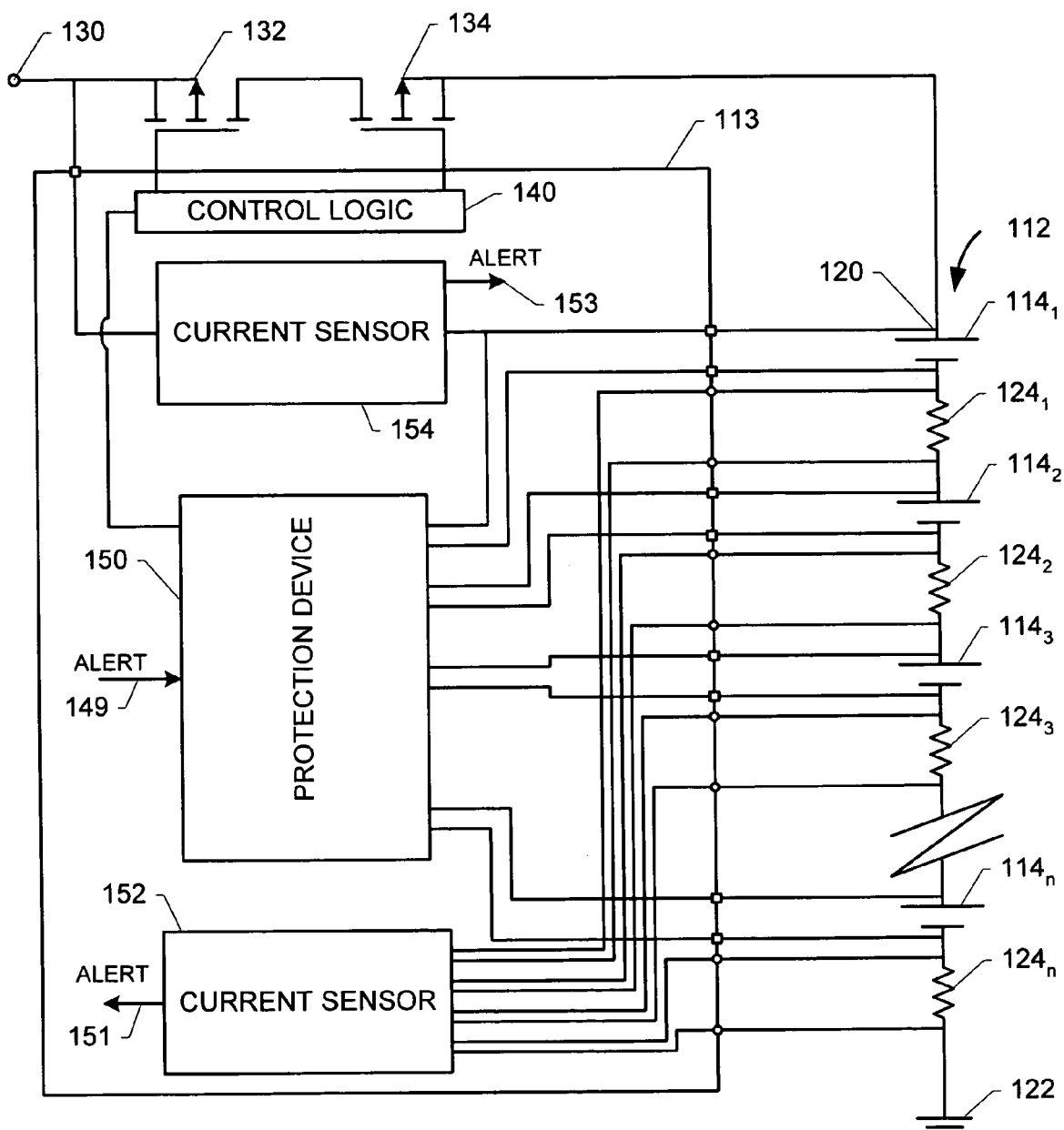
FIG. 2 is a schematic diagram illustrating a first alternate embodiment of the present invention.

FIG. 2 is a schematic diagram illustrating a first alternate embodiment of the present invention. In FIG. 2, a battery pack 100 includes a battery cell array 112 and a protective system 113. Battery cell array 112 includes a plurality of batteries, represented by battery cells $114_1$, $114_2$, $114_3$, $114_n$ coupled together to present an output voltage at a battery potential locus 120. The indicator "n" is employed to signify that there can be any number of battery cells $114_n$ in battery cell array 112. The inclusion of four battery cells $114_1$, $114_2$, $114_3$, $114_n$ in FIG. 2 is illustrative only and does not constitute any limitation regarding the number of battery cells that may be included in battery cell array 112. Battery cells $114_1$, $114_2$, $114_3$, $114_n$ are connected in series with resistors $124_1$, $124_2$, $124_3$, $124_n$. Resistor $124_1$ is coupled between battery cells $114_1$, $114_2$. Resistor $124_2$ is coupled between battery cells $114_2$, $114_3$. Resistor $124_3$ is coupled between battery cells $114_3$, $114_n$. Resistor $124_n$ is coupled between battery cells $114_n$ and ground locus 122. The indicator "n" is employed to signify that there can be any number of resistors $124_n$ in battery cell array 112. The inclusion of four resistors $124_1$, $124_2$, $124_3$, $124_n$ in FIG. 2 is illustrative only and does not constitute any limitation regarding the number of resistors that may be included in battery cell array 112. It is preferred but not required that the number of resistors $124_n$ equal the number of battery cells $114_n$.

A charging potential (not shown in FIG. 2) may be applied at a charging locus 130 for charging battery cell array 112. Charging locus 130 is coupled with battery cell array 112 via a charge FET (field effect transistor) 132 and a discharge FET 134 coupled in series. A control logic unit 140 is coupled with charge FET 132 and discharge FET 134 to control their operation and thereby control connection of charging locus 130 with battery cell array 112. Control logic unit 140 is coupled with a protective device 150. Protective device 150 is also coupled across each respective cell $114_1$, $114_2$, $114_3$, $114_n$ in battery cell array 112. Protective device 150 is illustrated in FIG. 2 as a single unitary protective device. However, protective device 150 may be embodied in a plurality of individual protective devices (not shown in FIG. 2), each of which individual protective devices is connected across a respective battery cell $114_1$, $114_2$, $114_3$, $114_n$.

A current sensor device 152 is coupled across each resistor $124_n$. Current sensor device 152 has an alert signal output locus 151. Protective device 150 has an alert signal input locus 149 that is coupled with alert signal output locus 151 (connection not shown in FIG. 2). Whenever battery pack 100 is in a very low or an ultra-low power state and current through resistor 124 is greater than a predetermined amount current sensor device 152 generates an ALERT signal at alert signal output locus 151. Protective device 150 receives the ALERT signal at alert signal input locus 149 and responds to the ALERT signal by enabling predetermined safeguards that are disabled because battery pack 100 is in an ultra-low power state. Current sensor device 152 is illustrated in FIG. 2 as a single unitary current sensor device. However, current sensor device 152 may be embodied in a plurality of individual protective devices (not shown in FIG. 2), each of which individual protective devices is connected across a respective resistor $124_1$, $124_2$, $124_3$, $124_n$.

Another current sensor device 154 is coupled with charging locus 130 and battery potential locus 120. Current sensor device 154 has an alert signal output locus 153. Alert signal output locus 153 is coupled with alert signal input locus 149 (connection not shown in FIG. 2). Whenever battery pack 100 is in a very low or an ultra-low power state and current between charging locus 130 and battery potential locus 120 is greater than a predetermined amount current sensor 154 generates an ALERT signal at alert signal output locus 153. Protective device 150 receives the ALERT signal at alert signal input locus 149 and responds to the ALERT signal by enabling predetermined safeguards that are disabled because battery pack 100 is in an ultra-low power state.

Whenever battery pack 100 is in an ultra-low power state most protection features or safeguards provided by protection device 150 are disabled to conserve power. In such an ultra-low power state, FETs 132, 134 are also usually turned off. Prior art battery packs only permit exiting the ultra-low power state by applying a voltage to charging locus 130 that is greater than potential at battery potential locus 120. This operation is typically accomplished using a battery charger unit connected with charging locus 130.

However, if one of FETs 132, 134 is damaged when using a charging unit attached with charging locus 130 or if reverse current from charging locus 130 to battery potential locus 120 is great enough to overcome one of FETs 132, 134, then an over-current or overload condition could occur. Protective device 150 cannot protect against an over-current or overload condition in such circumstances because safeguards protecting against such conditions are disabled while battery pack 100 is in the ultra-low state. As a result, battery pack 100 may be damaged beyond use or repair.

The apparatus of the present invention equips battery pack 100 to sense current draw that would occur in the circumstance of applying a voltage to charging locus 130 with either of FETs 132, 134 damaged, shorted, overcome or otherwise breached. Protective device 150 is structured to respond to the sensing (i.e., responds to the ALERT signal from either of current sensors 152, 154) to enable appropriate safeguards to be exercised by protective device 150 to keep battery pack 100 safe.

Figure 3:
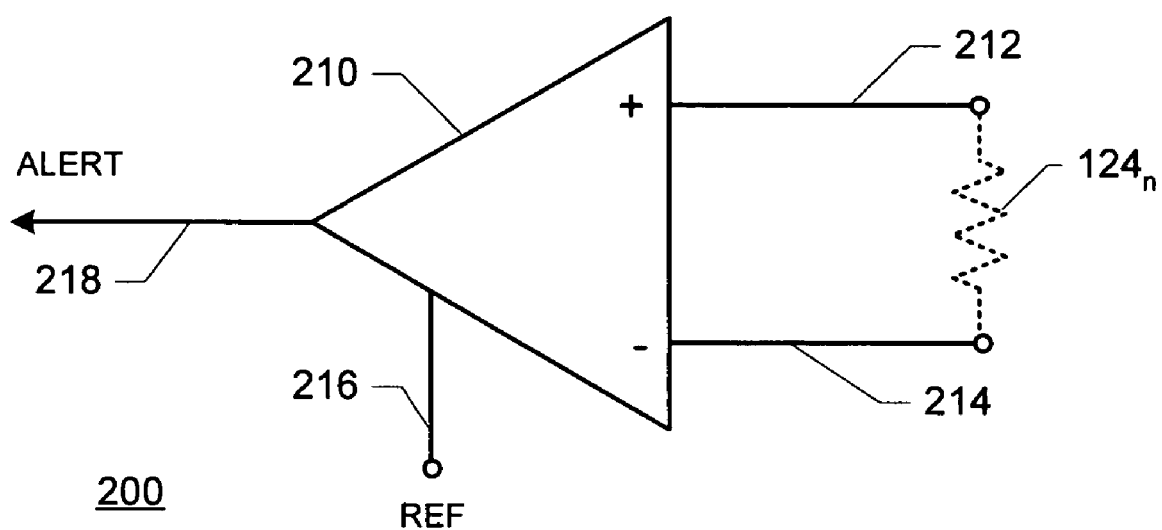
FIG. 3 is a schematic diagram of the preferred embodiment of the current sensing device used for the present invention.

FIG. 3 is a schematic diagram of the preferred embodiment of the current sensing device used for the present invention. In FIG. 3, a current sensing device 200 is embodied in a differential comparator 210 having a non-inverted input locus 212 and an inverted input locus 214. A reference signal REF is received at a reference locus 216. An output ALERT signal is presented at an output locus 218 whenever the difference between signals at input loci 212, 214 is greater than reference signal REF. Connecting input loci 212, 214 across a resistor, such as resistor $124_n$ (FIGS. 1, 2; shown in phantom in FIG. 3 for exemplary purposes) permits differential comparator to operate as a current sensing device without introducing significant impedance into a battery cell array (e.g., battery cell arrays 12, 112; FIGS. 1, 2).

Figure 4:
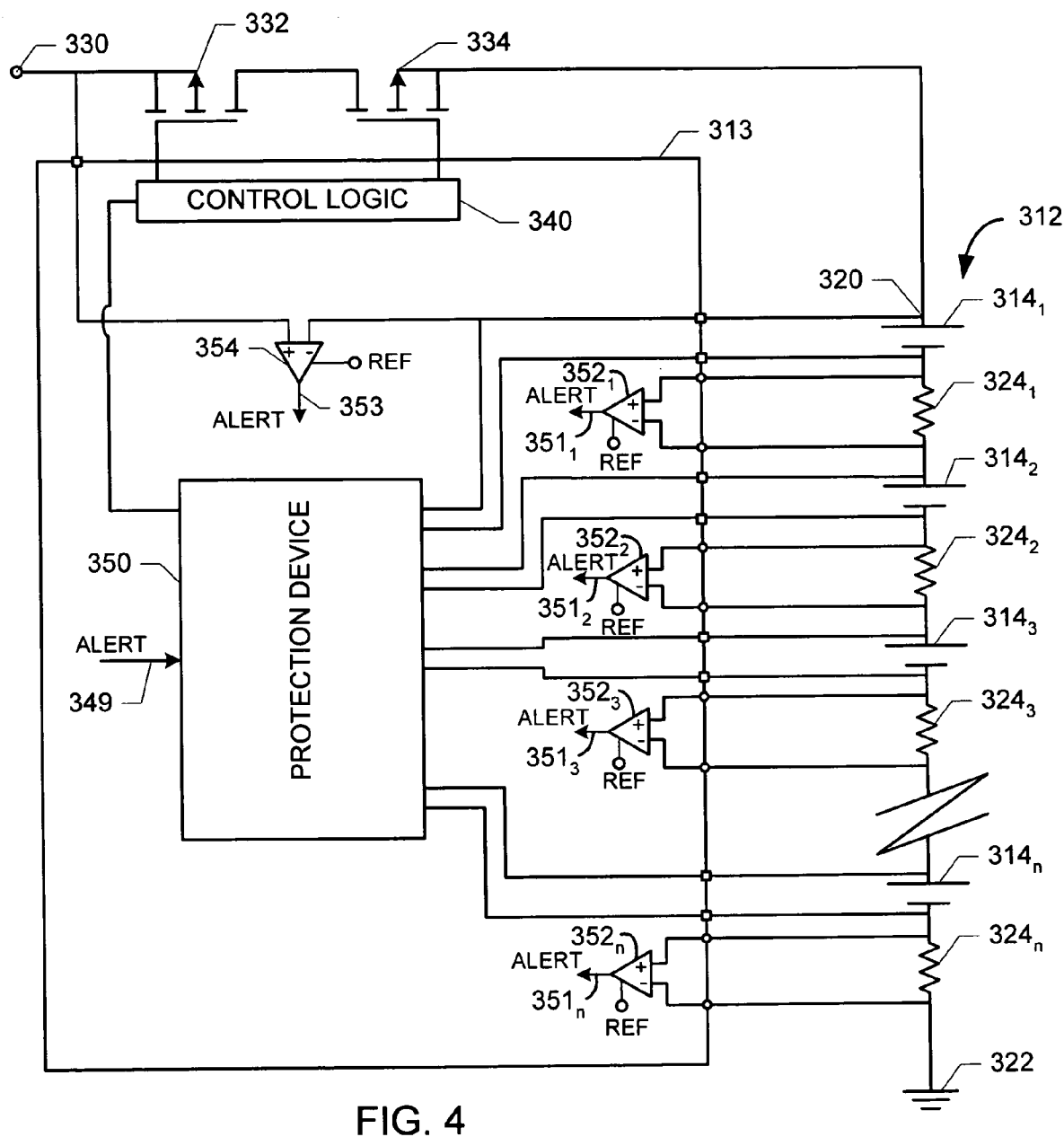
FIG. 4 is a schematic diagram illustrating a second alternate embodiment of the present invention.

FIG. 4 is a schematic diagram illustrating a second alternate embodiment of the present invention. In FIG. 4, a battery pack 300 includes a battery cell array 312 and a protective system 313. Battery cell array 312 includes a plurality of batteries, represented by battery cells $314_1$, $314_2$, $314_3$, $314_n$ coupled together to present an output voltage at a battery potential locus 320. The indicator "n" is employed to signify that there can be any number of battery cells $314_n$ in battery cell array 312. The inclusion of four battery cells $314_1$, $314_2$, $314_3$, $314_n$ in FIG. 4 is illustrative only and does not constitute any limitation regarding the number of battery cells that may be included in battery cell array 312. Battery cells $314_1$, $314_2$, $314_3$, $314_n$ are connected in series with resistors $324_1$, $324_2$, $324_3$, $324_n$. Resistor $324_1$ is coupled between battery cells $314_1$, $314_2$. Resistor $324_2$ is coupled between battery cells $314_2$, $314_3$. Resistor $324_3$ is coupled between battery cells $314_3$, $314_n$. Resistor $324_n$ is coupled between battery cells $314_n$ and ground locus 322. The indicator "n" is employed to signify that there can be any number of resistors $324_n$ in battery cell array 312. The inclusion of four resistors $324_1$, $324_2$, $324_3$, $324_n$ in FIG. 4 is illustrative only and does not constitute any limitation regarding the number of resistors that may be included in battery cell array 312. It is preferred but not required that the number of resistors $324_n$, equal the number of battery cells $314_n$. A charging potential (not shown in FIG. 4) may be applied at a charging locus 330 for charging battery cell array 312. Charging locus 330 is coupled with battery cell array 312 via a charge FET (field effect transistor) 332 and a discharge FET 334 coupled in series. A control logic unit 340 is coupled with charge FET 332 and discharge FET 334 to control their operation and thereby control connection of charging locus 330 with battery cell array 312. Control logic unit 340 is coupled with a protective device 350. Protective device 350 is also coupled across each respective cell $314_1$, $314_2$, $314_3$, $314_n$ in battery cell array 312. Protective device 350 is illustrated in FIG. 4 as a single unitary protective device. However, protective device 350 may be embodied in a plurality of individual protective devices (not shown in FIG. 4), each of which individual protective devices is connected across a respective battery cell $314_1$, $314_2$, $314_3$, $314_n$.

A plurality of current sensor devices $352_n$ are coupled across resistors $324_1$, $324_2$, $324_3$, $324_n$. Current sensor device $352_1$ is coupled across resistor $324_1$. Current sensor device $352_1$ has an alert signal output locus $351_1$. Whenever battery pack 300 is in a very low or an ultra-low power state and current through resistor $324_1$ is greater than a predetermined amount current sensor device $352_1$ generates an ALERT signal at alert signal output locus $351_1$. Current sensor device $352_2$ is coupled across resistor $324_2$. Current sensor device $352_2$ has an alert signal output locus $351_2$. Whenever battery pack 300 is in a very low or an ultra-low power state and current through resistor $324_2$ is greater than a predetermined amount current sensor device $352_2$ generates an ALERT signal at alert signal output locus $351_2$. Current sensor device $352_3$ is coupled across resistor $324_3$. Current sensor device $352_3$ has an alert signal output locus $351_3$. Whenever battery pack 300 is in a very low or an ultra-low power state and current through resistor $324_3$ is greater than a predetermined amount current sensor device $352_3$ generates an ALERT signal at alert signal output locus $351_3$. Current sensor device $352_n$ is coupled across resistor $324_n$. Current sensor device $352_n$ has an alert signal output locus $351_n$. Whenever battery pack 300 is in a very low or an ultra-low power state and current through resistor $324_n$ is greater than a predetermined amount current sensor device $352_n$ generates an ALERT signal at alert signal output locus $351_n$.

The indicator "n" is employed to signify that there can be any number of current sensor devices $352_n$ in battery pack 300. The inclusion of four current sensor devices $352_1$, $352_2$, $352_3$, $352_n$ in FIG. 4 is illustrative only and does not constitute any limitation regarding the number of current sensor devices that may be included in battery pack 300. It is preferred but not required that the number of current sensor devices $352_n$, equal the number of battery cells $314_n$.

Protective device 350 has an alert signal input locus 349 that is coupled with alert signal output loci $351_1$, $351_2$, $351_3$, $351_n$ (connections not shown in FIG. 4). Whenever battery pack 300 is in a very low or an ultra-low power state and current through a resistor $324_n$ is greater than a predetermined amount, a respective current sensor device $352_n$ generates an ALERT signal at a respective alert signal output locus $351_n$. Protective device 350 receives at least one of the ALERT signals at alert signal input locus 349 from an alert signal output locus $351_n$ and responds to receiving at least one of the ALERT signals by enabling predetermined safeguards that are disabled because battery pack 300 is in an ultra-low power state. Current sensor devices $352_n$ are illustrated in FIG. 4 as differential comparators (e.g., differential comparator 210; FIG. 3). However, current sensor devices $352_n$ may be embodied other current sensing devices connected across a respective resistor $324_1$, $324_2$, $324_3$, $324_n$.

Another current sensor device 354 is coupled with charging locus 330 and battery potential locus 320. Current sensor device 354 is illustrated in FIG. 4 as being embodied in a differential comparator (e.g., differential comparator 210; FIG. 3) and has an alert signal output locus 353. Alert signal output locus 353 is coupled with alert signal input locus 349 (connection not shown in FIG. 4). Whenever battery pack 300 is in a very low or an ultra-low power state and current between charging locus 330 and battery potential locus 320 is greater than a predetermined amount current sensor 354 generates an ALERT signal at alert signal output locus 353. Protective device 350 receives the ALERT signal at alert signal input locus 349 and responds to the ALERT signal by enabling predetermined safeguards that are disabled because battery pack 300 is in an ultra-low power state.

Whenever battery pack 300 is in an ultra-low power state most protection features or safeguards provided by protection device 350 are disabled to conserve power. In such an ultra-low power state, FETs 332, 334 are also usually turned off. Prior art battery packs only permit exiting the ultra-low power state by applying a voltage to charging locus 330 that is greater than potential at battery potential locus 320. This operation is typically accomplished using a battery charger unit connected with charging locus 330.

However, if one of FETs 332, 334 is damaged when using a charging unit attached with charging locus 330 or if reverse current from charging locus 330 to battery potential locus 320 is great enough to overcome one of FETs 332, 334, then an over-current or overload condition could occur. Protective device 350 cannot protect against an over-current or overload condition in such circumstances because safeguards protecting against such conditions are disabled while battery pack 300 is in the ultra-low state. As a result, battery pack 300 may be damaged beyond use or repair.

The apparatus of the present invention equips battery pack 300 to sense current draw that would occur in the circumstance of applying a voltage to charging locus 330 with either of FETs 332, 334 damaged, shorted, overcome or otherwise breached. Protective device 350 is structured to respond to the sensing (i.e., responds to the ALERT signal from either of current sensors 352, 354) to enable appropriate safeguards to be exercised by protective device 350 to keep battery pack 300 safe.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for controlling operation of a protection device for a battery pack when said battery pack is in a very low power state; said battery pack including a plurality of battery cells coupled together to present an output voltage; at least one selected safeguard provided by said protection device being disabled during said very low power state; the apparatus comprising at least one comparing unit coupled with at least one battery cell of said plurality of battery cells and coupled with said protection device; said at least one comparing unit comparing at least one battery signal level associated with said at least one battery cell with at least one first reference signal level; said at least one comparing unit generating a first alerting output signal when said at least one battery signal level achieves a predetermined relationship with said at least one first reference signal level; said protection device enabling at least one of said at least one selected safeguard in response to said first alerting output signal.

2. An apparatus for controlling operation of a protection device for a battery pack when said battery pack is in a very low power state as recited in claim 1 wherein said battery pack includes a charging locus for connecting a charging unit for charging said battery pack and wherein the apparatus further comprises an input comparing unit coupled with said charging input locus and coupled to receive said output voltage; said input comparing unit comparing at least one input signal level associated with said charging locus with at least one second reference signal level; said input comparing unit generating a second alerting output signal when said at least one input signal level achieves a predetermined relationship with said at least one second reference signal level; said protection device enabling at least one of said at least one selected safeguard in response to said second alerting output signal.

3. An apparatus for controlling operation of a protection device for a battery pack when said battery pack is in a very low power state as recited in claim 1 wherein each respective comparing unit of said at least one comparing unit is coupled for effecting said comparing of said at least one battery signal level associated with a respective battery cell of said plurality of battery cells.

4. An apparatus for controlling operation of a protection device for a battery pack when said battery pack is in a very low power state as recited in claim 3 wherein each said respective comparing unit is a differential comparator device coupled for sensing voltage across a respective resistor; each said respective resistor being coupled in series with one said respective battery cell.

5. An apparatus for controlling operation of a protection device for a battery pack when said battery pack is in a very low power state as recited in claim 1 wherein said plurality of battery cells are coupled in series between a low potential locus and a battery potential locus and wherein said at least one comparing unit is one comparing unit coupled for effecting said comparing of said battery signal level associated with a battery cell of said plurality of battery cells closest to said low potential locus.

6. An apparatus for controlling operation of a protection device for a battery pack when said battery pack is in a very low power state as recited in claim 2 wherein each respective comparing unit of said at least one comparing unit is coupled for effecting said comparing of said at least one battery signal level associated with a respective battery cell of said plurality of battery cells.

7. An apparatus for controlling operation of a protection device for a battery pack when said battery pack is in a very low power state as recited in claim 6 wherein each said respective comparing unit is a differential comparator device coupled for sensing voltage across a respective resistor; each said respective resistor being coupled in series with one said respective battery cell.

8. An apparatus for controlling operation of a protection device for a battery pack when said battery pack is in a very low power state as recited in claim 2 wherein said plurality of battery cells are coupled in series between a low potential locus and a battery potential locus and wherein said at least one comparing unit is one comparing unit coupled for effecting said comparing of said battery signal level associated with a battery cell of said plurality of battery cells closest to said low potential locus.

9. An apparatus for use with a battery pack when said battery pack is in a very low power state; said battery pack including a plurality of battery cells coupled to present an output voltage at a battery potential locus; said battery pack further including a protection device for providing a plurality of safeguards to protect said battery pack; the apparatus affecting operation of said protection device to control at least one safeguard of said plurality of safeguards; the apparatus comprising a current sensing unit coupled with said plurality of battery cells and with said protection device; said current sensing unit sensing a battery traversing current associated with at least one battery cell of said plurality of battery cells; said current sensing unit generating a first alerting signal when said battery traversing current exceeds a predetermined value; said protection device enabling said at least one safeguard in response to said first alerting signal.

10. An apparatus for use with a battery pack when said battery pack is in a very low power state as recited in claim 9 wherein said battery pack includes a charging locus for connecting a charging unit for charging said battery pack and wherein the apparatus further comprises an input comparing unit coupled with said charging input locus and coupled with said battery potential locus; said input comparing unit comparing at least one input signal level associated with said charging locus with at least one reference signal level; said input comparing unit generating a second alerting signal when said at least one input signal level achieves a predetermined relationship with said at least one reference signal level; said protection device enabling said at least one safeguard in response to said second alerting signal.

11. An apparatus for use with a battery pack when said battery pack is in a very low power state as recited in claim 9 wherein said current sensing unit is a differential comparator device coupled for sensing voltage across a resistor; said resistor being coupled in series with said at least one battery cell.

12. An apparatus for use with a battery pack when said battery pack is in a very low power state as recited in claim 10 wherein said current sensing unit is a differential comparator device coupled for sensing voltage across a resistor; said resistor being coupled in series with said at least one battery cell.

13. An apparatus for use with a battery pack when said battery pack is in a very low power state; said battery pack including a plurality of battery cells coupled to present an output voltage at a battery potential locus; said battery pack further including a protection device for providing a plurality of safeguards to protect said battery pack; the apparatus affecting operation of said protection device to control at least one safeguard of said plurality of safeguards; the apparatus comprising a plurality of current sensing units; each respective current sensing unit of said plurality of current sensing units being coupled with said protection device and coupled with a coupled respective battery cell of said plurality of battery cells; each said respective current sensing unit sensing a battery traversing current associated with said coupled respective battery cell; each said respective current sensing unit generating a first alerting signal when said battery traversing current associated with said coupled respective battery cell exceeds a predetermined value; said protection device enabling said at least one safeguard in response to said first alerting signal.

14. An apparatus for use with a battery pack when said battery pack is in a very low power state as recited in claim 13 wherein each said respective current sensing unit is a differential comparator device coupled for sensing voltage across a respective resistor; said respective resistor being coupled in series with said coupled respective battery cell.

* * * * *